(12) United States Patent
Braunroth

(10) Patent No.: US 11,465,345 B2
(45) Date of Patent: Oct. 11, 2022

(54) APPARATUS FOR ADDITIVELY MANUFACTURING THREE-DIMENSIONAL OBJECTS

(71) Applicant: Concept Laser GmbH, Lichtenfels (DE)

(72) Inventor: Domenik Braunroth, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 176 days.

(21) Appl. No.: 16/832,631

(22) Filed: Mar. 27, 2020

(65) Prior Publication Data
US 2020/0316857 A1  Oct. 8, 2020

(30) Foreign Application Priority Data

Apr. 2, 2019 (EP) ..................................... 19166772

(51) Int. Cl.
| | |
|---|---|
| B29C 64/205 | (2017.01) |
| B29C 64/214 | (2017.01) |
| B29C 64/232 | (2017.01) |
| B29C 64/236 | (2017.01) |
| B29C 64/241 | (2017.01) |

(Continued)

(52) U.S. Cl.
CPC .......... B29C 64/205 (2017.08); B29C 64/214 (2017.08); B29C 64/232 (2017.08);
(Continued)

(58) Field of Classification Search
CPC ... B29C 64/153; B29C 64/214; B29C 64/205; B29C 64/30; B29C 41/12
See application file for complete search history.

(56) References Cited

U.S. PATENT DOCUMENTS

| | | | | |
|---|---|---|---|---|
| 7,879,393 B2 * | 2/2011 | Ederer | .................. | B29C 64/153 |
| | | | | 427/560 |
| 7,946,840 B2 * | 5/2011 | Perret | .................. | B29C 64/153 |
| | | | | 264/494 |

(Continued)

FOREIGN PATENT DOCUMENTS

CN   205587659 U   9/2016

OTHER PUBLICATIONS

European Search Report Corresponding to EP19166772 dated Oct. 23, 2019.

*Primary Examiner* — Atul P. Khare
(74) *Attorney, Agent, or Firm* — Dority & Manning, P.A.

(57) ABSTRACT

Apparatus for additively manufacturing three-dimensional objects formed by irradiation and consolidation of layers of build material. The apparatus may include at least one build plane; at least one build material application device being adapted to apply an amount of build material in the at least one build plane, the at least one build material application device comprising at least one build material application element being moveably supported in a first motion path in which the at least one build material application element is moveable or moved across the at least one build plane, wherein the at least one build material application element is transferrable in a first orientation in which the at least one build material application element is operable to apply an amount of build material in the at least one build plane and in a second orientation in which the at least one build material application element is not operable to apply an amount of build material in the at least one build plane.

16 Claims, 10 Drawing Sheets

(51) Int. Cl.
  *B33Y 40/00* (2020.01)
  *B29C 64/30* (2017.01)
  *B33Y 10/00* (2015.01)
  *B33Y 30/00* (2015.01)
  *B29C 64/153* (2017.01)
  *B29C 64/268* (2017.01)
  *B29C 41/12* (2006.01)

(52) U.S. Cl.
  CPC .......... *B29C 64/236* (2017.08); *B29C 64/241* (2017.08); *B29C 64/30* (2017.08); *B33Y 40/00* (2014.12); *B29C 41/12* (2013.01); *B29C 64/153* (2017.08); *B29C 64/268* (2017.08); *B33Y 10/00* (2014.12); *B33Y 30/00* (2014.12)

(56) References Cited

U.S. PATENT DOCUMENTS

| | | |
|---|---|---|
| 9,878,494 B2 | 1/2018 | Hartmann et al. |
| 9,931,785 B2* | 4/2018 | Cullen .................... B22F 12/00 |
| 9,975,296 B2* | 5/2018 | El-Siblani ............. B29C 64/241 |
| 10,105,758 B2* | 10/2018 | Aydin ................... B22F 1/0003 |
| 10,252,333 B2* | 4/2019 | McMurtry ............ B29C 64/153 |
| 11,000,999 B2* | 5/2021 | Braunroth ............. B29C 64/135 |
| 2018/0056588 A1 | 3/2018 | Herzog et al. |
| 2018/0079137 A1 | 3/2018 | Herzog et al. |
| 2018/0257140 A1 | 9/2018 | Pontiller-Schymura et al. |
| 2019/0039307 A1* | 2/2019 | Hofmann ................ B22F 12/00 |
| 2019/0091921 A1 | 3/2019 | Paternoster et al. |
| 2019/0314930 A1* | 10/2019 | Winiarski .......... B23K 26/0884 |
| 2020/0316860 A1* | 10/2020 | Braunroth ............. B29C 64/245 |

* cited by examiner

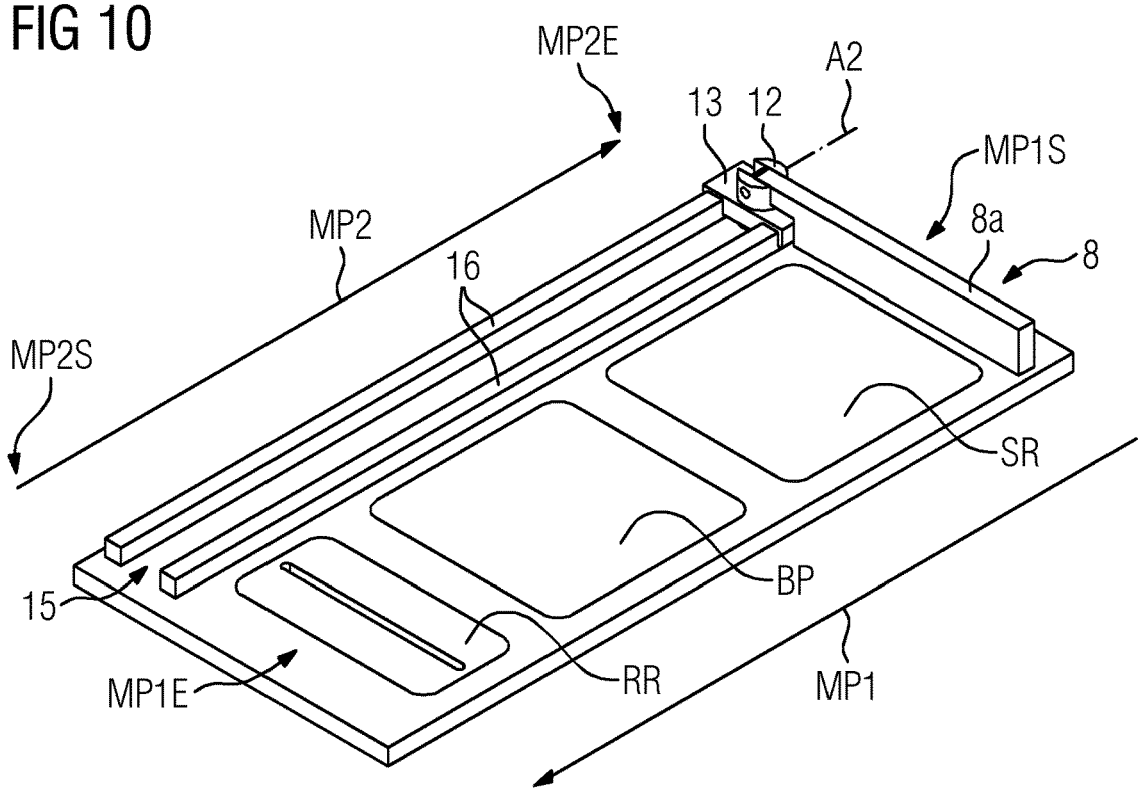
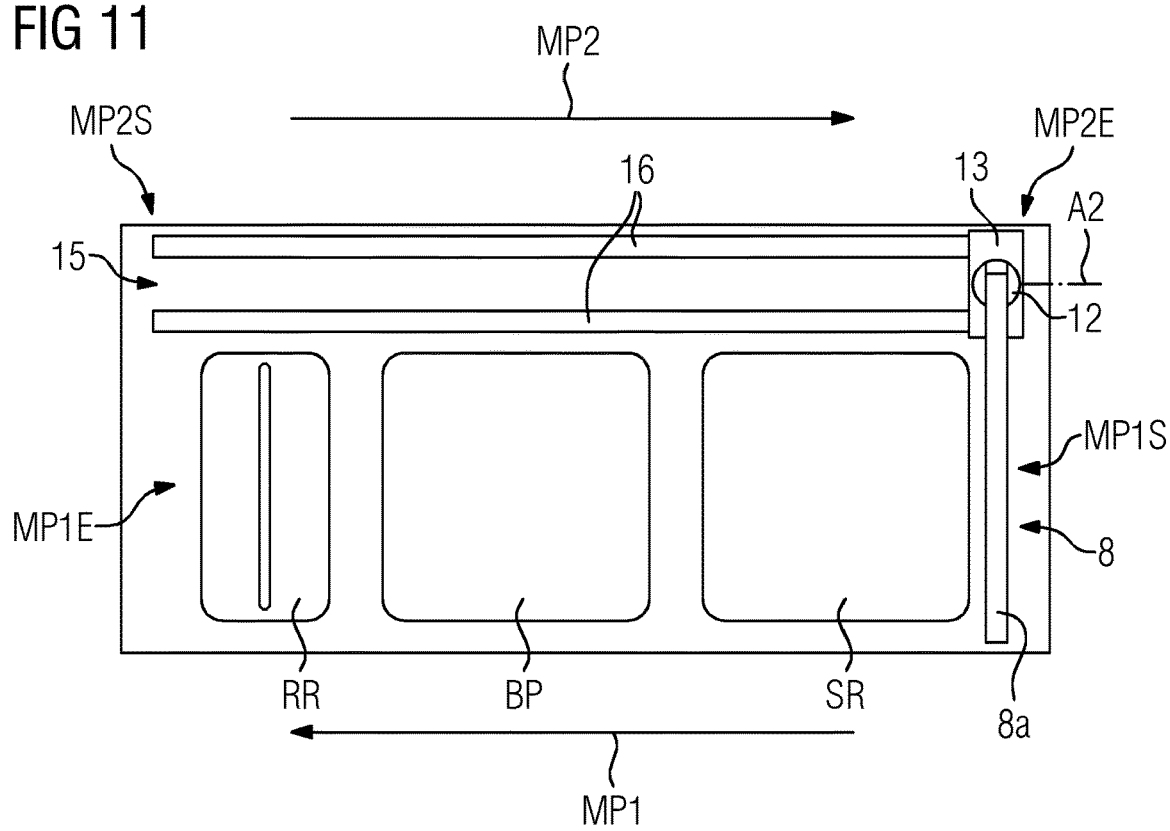

APPARATUS FOR ADDITIVELY MANUFACTURING THREE-DIMENSIONAL OBJECTS

PRIORITY INFORMATION

The present application claims priority to European Patent Application Serial Number 19166772.4 filed on Apr. 2, 2019.

FIELD OF TECHNOLOGY

The invention relates to an apparatus for additively manufacturing three-dimensional objects by means of successive layerwise selective irradiation and consolidation of layers of build material.

BACKGROUND

Respective apparatuses for additively manufacturing three-dimensional objects by means of successive layerwise selective irradiation and consolidation of layers of build material are generally known from prior art.

A respective apparatus typically comprises a build plane in which the successive layerwise selective irradiation and consolidation of layers of build material and thus, the additive build-up of three-dimensional objects takes place during operation of the apparatus. Build material layers which are to selectively irradiated and thereby, consolidated are successively applied in the build plane during operation of the apparatus.

The aspect of applying build material layers in a build plane of a respective apparatus is of high importance for the overall duration of the additive build process and thus, the overall productivity of the apparatus.

In order to increase productivity of a respective apparatus, build material application approaches with increased efficiency are desired. Build material application approaches with increased efficiency are of particular interest for implementing a series production of additively manufactured components.

Hence, there is a need for further improved apparatuses allowing for a more efficient and productive additive manufacturing of three-dimensional objects.

BRIEF DESCRIPTION

Aspects and advantages will be set forth in part in the following description, or may be obvious from the description, or may be learned through practice of the invention.

An apparatus is generally provided for additively manufacturing three-dimensional objects formed by consolidation of layers of build material. In one embodiment, the apparatus comprising: at least one build plane; at least one build material application device configured to apply an amount of build material in the at least one build plane, the at least one build material application device comprising at least one build material application element being moveably supported in a first motion path in which the at least one build material application element is moveable or moved across the at least one build plane. The at least one build material application element is transferrable in a first orientation in which the at least one build material application element is operable to apply an amount of build material in the at least one build plane and in a second orientation in which the at least one build material application element is not operable to apply an amount of build material in the at least one build plane.

Build material application devices and methods for such apparatus are also generally provided. These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 10 shows an enlarged view of a build material application device of the apparatus according to a second exemplary embodiment;

FIG. 11 shows an enlarged view of a build material application device of the apparatus according to a second exemplary embodiment;

Figure 1:
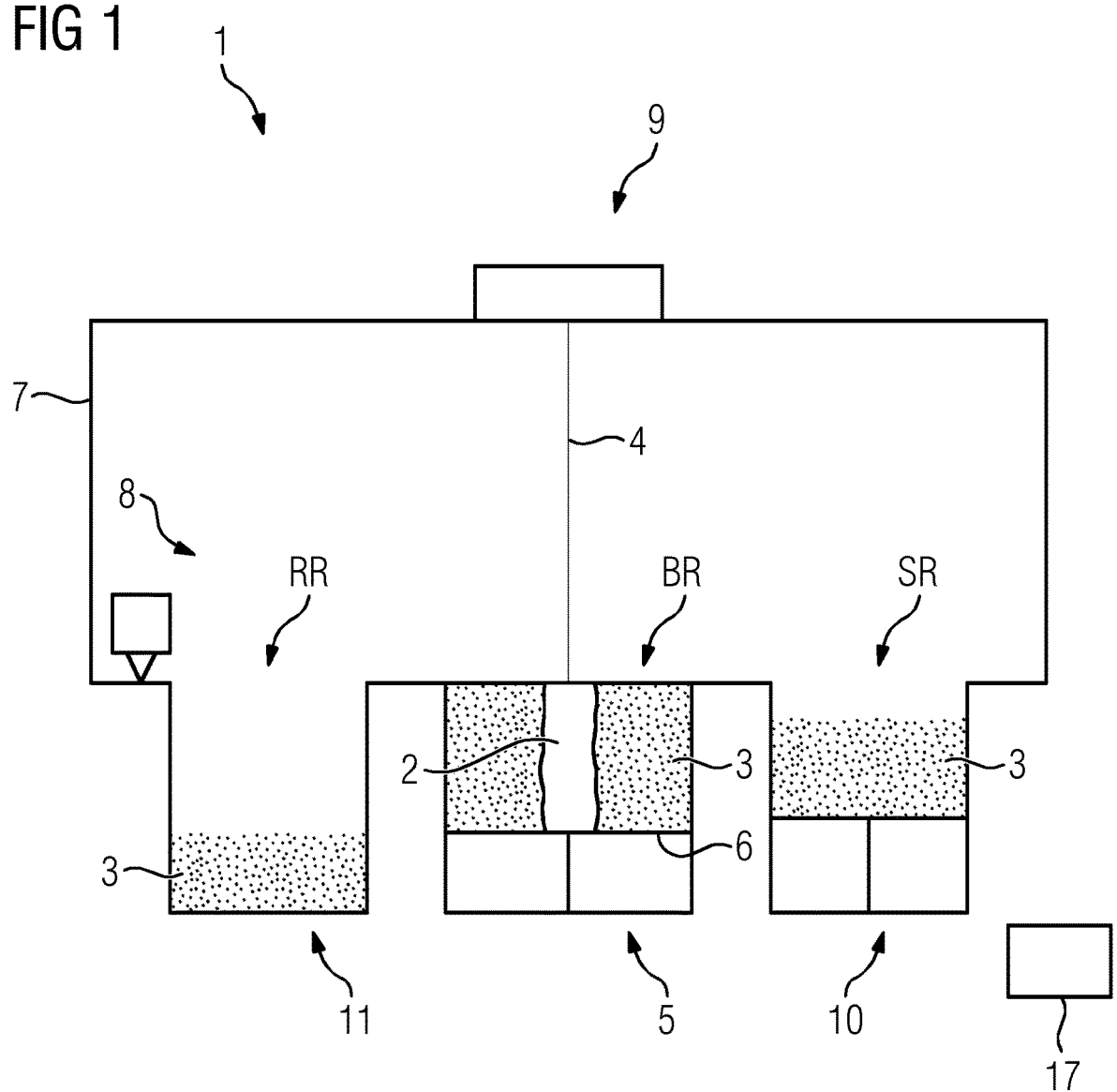
FIG. 1 shows a principle drawing of an apparatus for additively manufacturing three-dimensional objects according to an exemplary embodiment.
Figure 2:
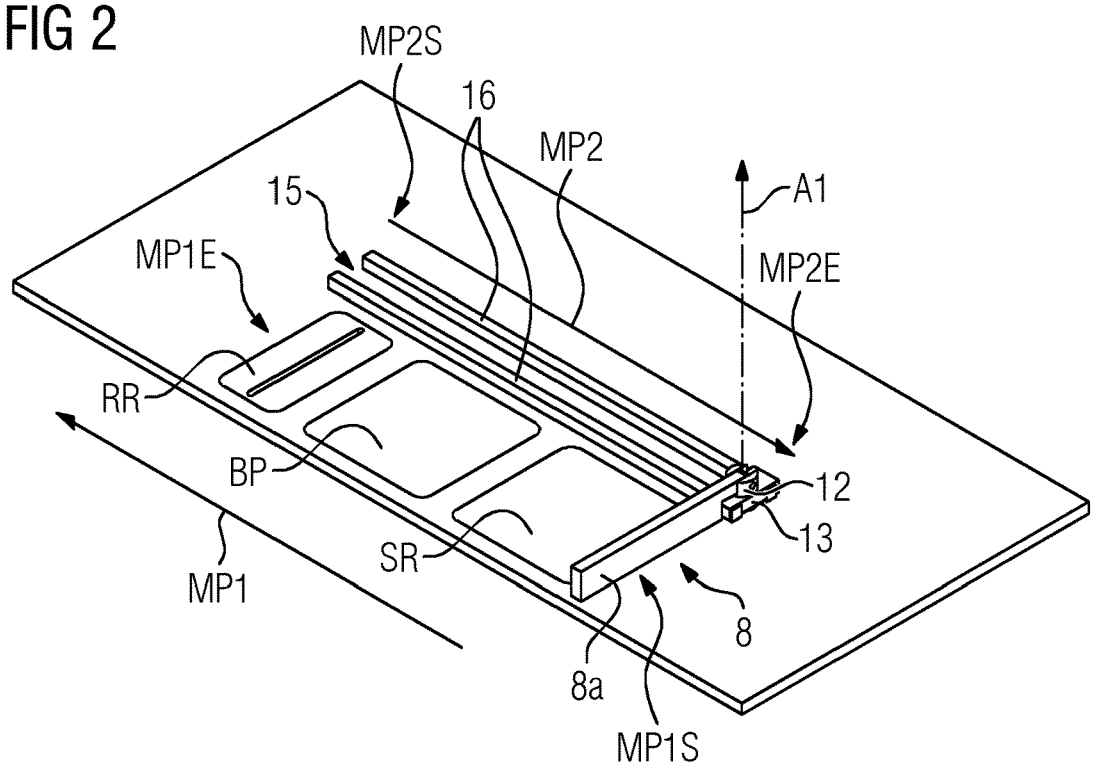
FIG. 2 shows an enlarged view of a build material application device of the apparatus according to a first exemplary embodiment.
Figure 3:
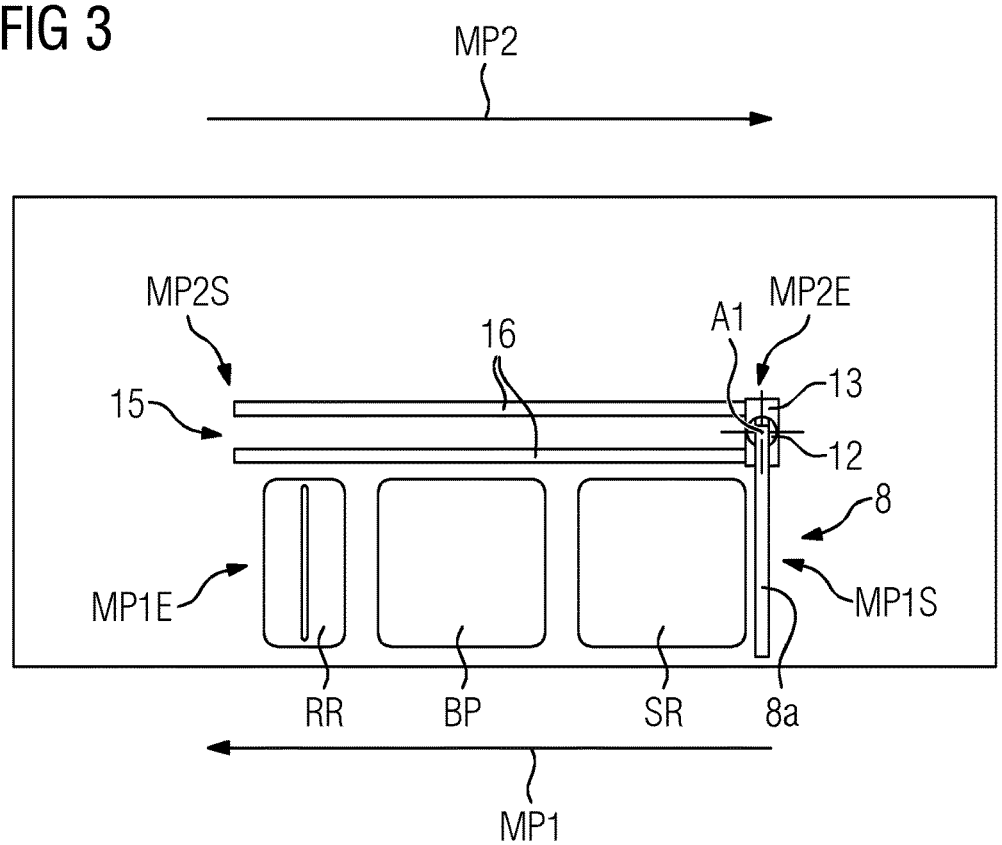
FIG. 3 shows an enlarged view of a build material application device of the apparatus according to a first exemplary embodiment.
Figure 4:
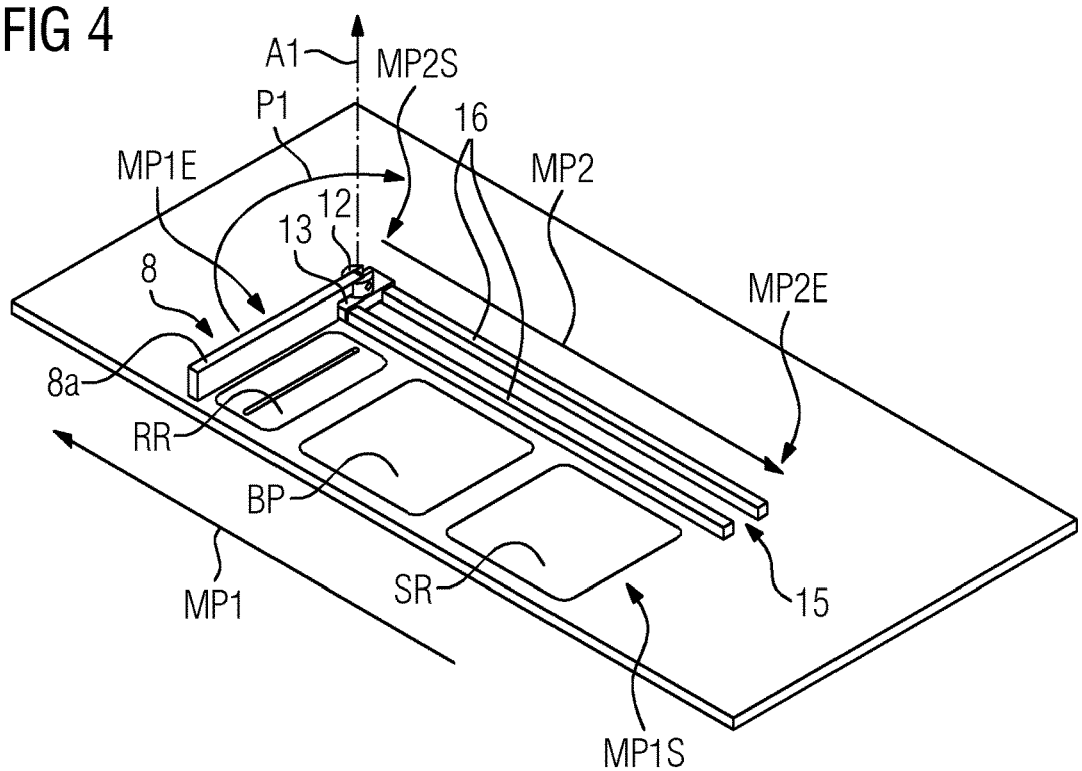
FIG. 4 shows an enlarged view of a build material application device of the apparatus according to a first exemplary embodiment.
Figure 5:
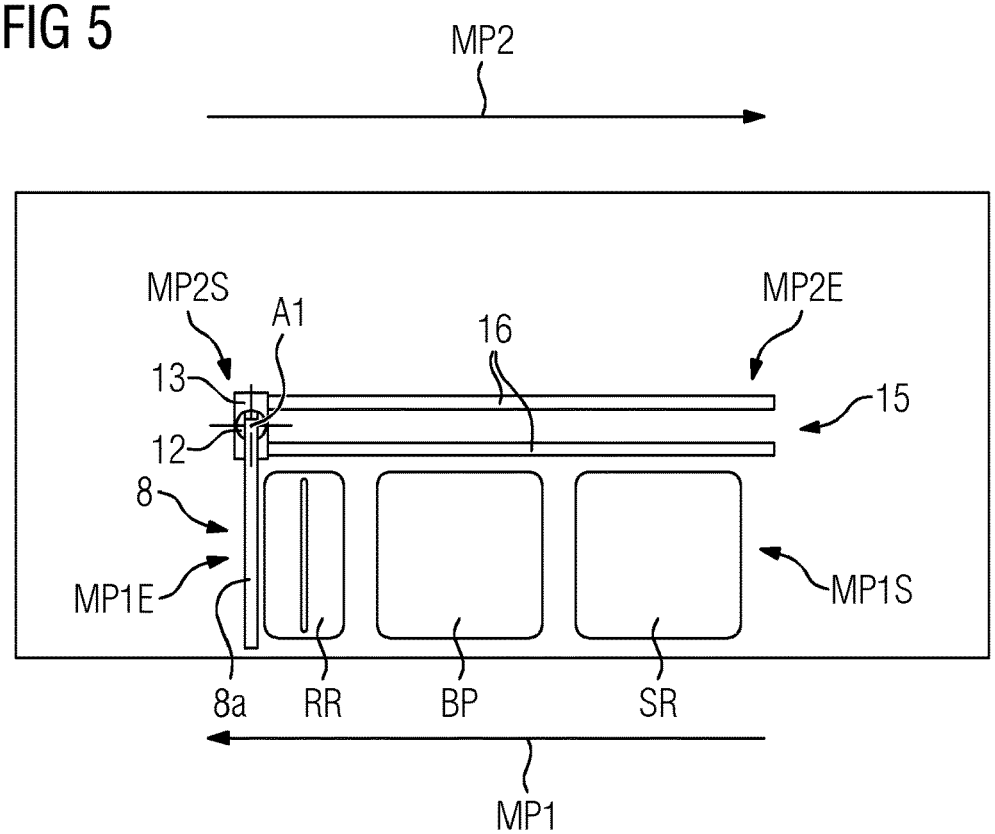
FIG. 5 shows an enlarged view of a build material application device of the apparatus according to a first exemplary embodiment.
Figure 6:
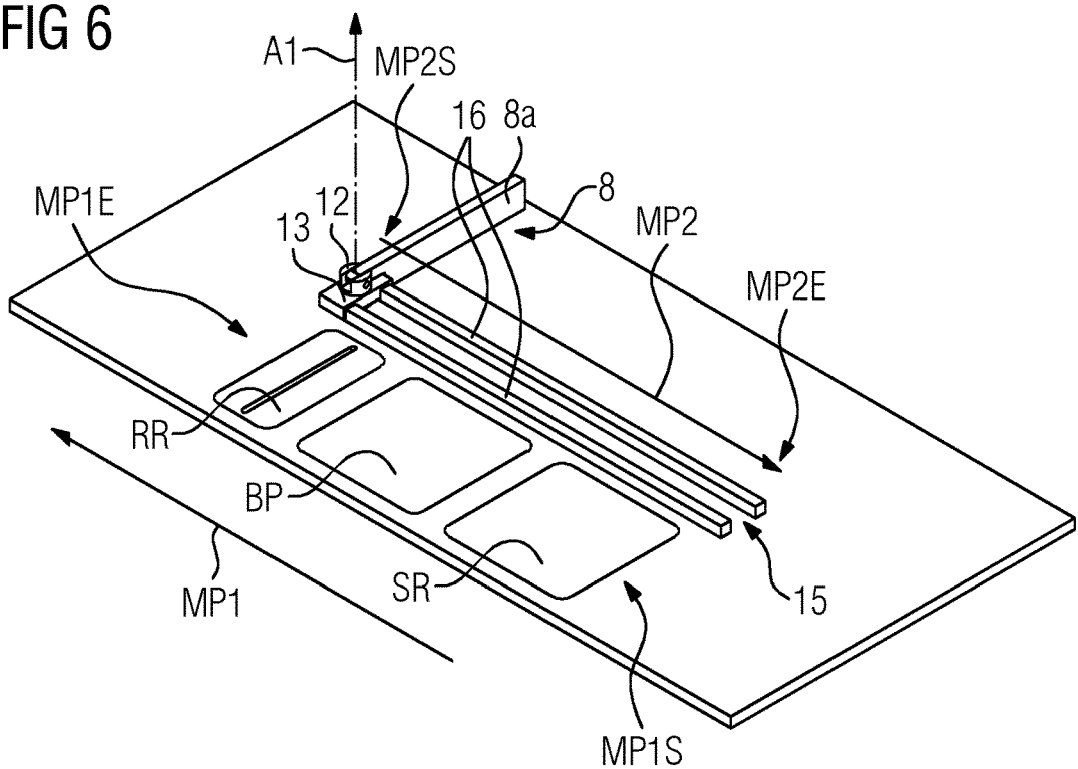
FIG. 6 shows an enlarged view of a build material application device of the apparatus according to a first exemplary embodiment.
Figure 7:
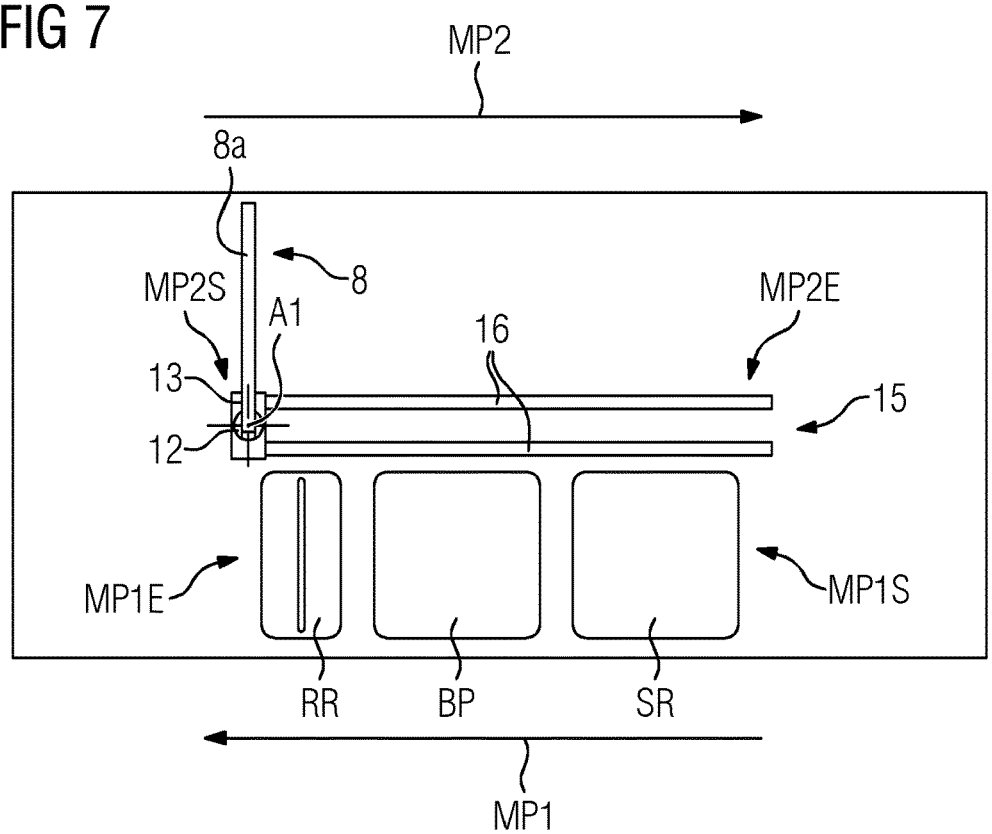
FIG. 7 shows an enlarged view of a build material application device of the apparatus according to a first exemplary embodiment.
Figure 8:
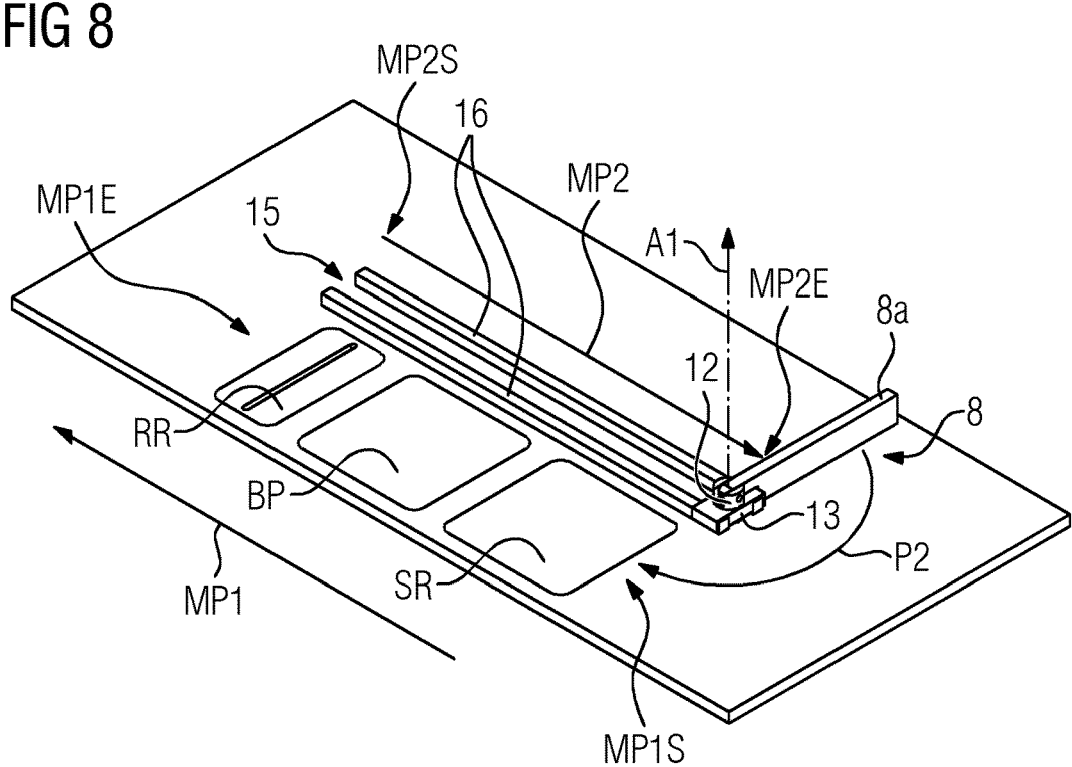
FIG. 8 shows an enlarged view of a build material application device of the apparatus according to a first exemplary embodiment.
Figure 9:
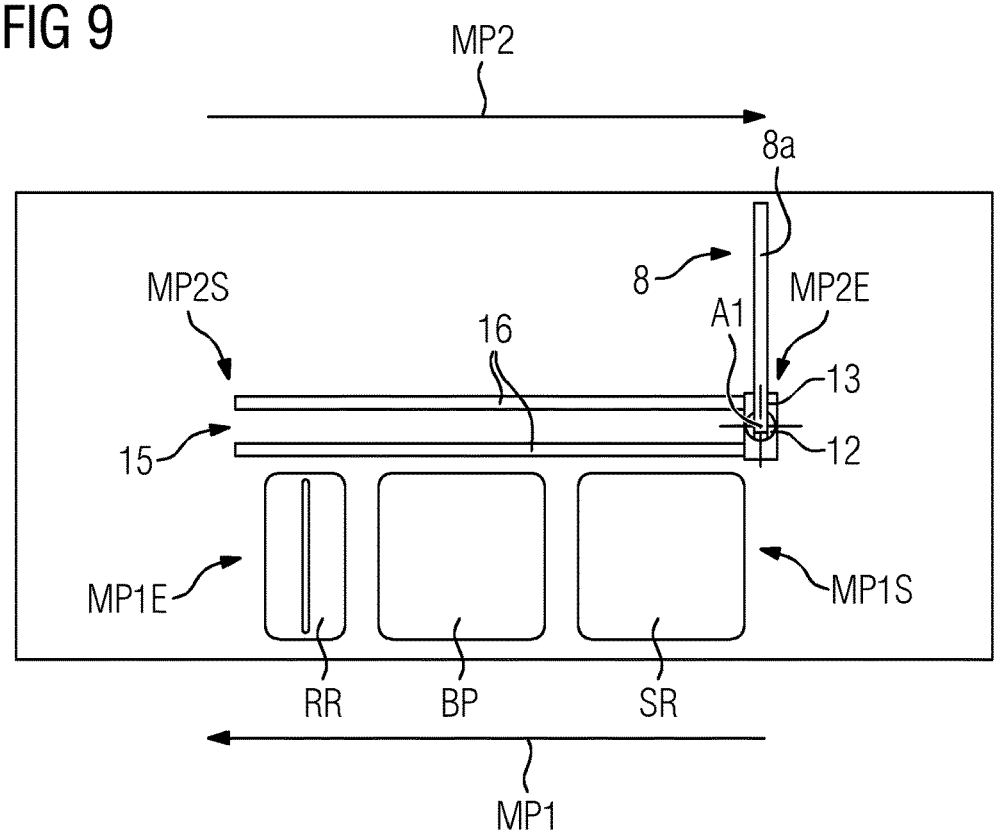
FIG. 9 shows an enlarged view of a build material application device of the apparatus according to a first exemplary embodiment.
Figure 12:
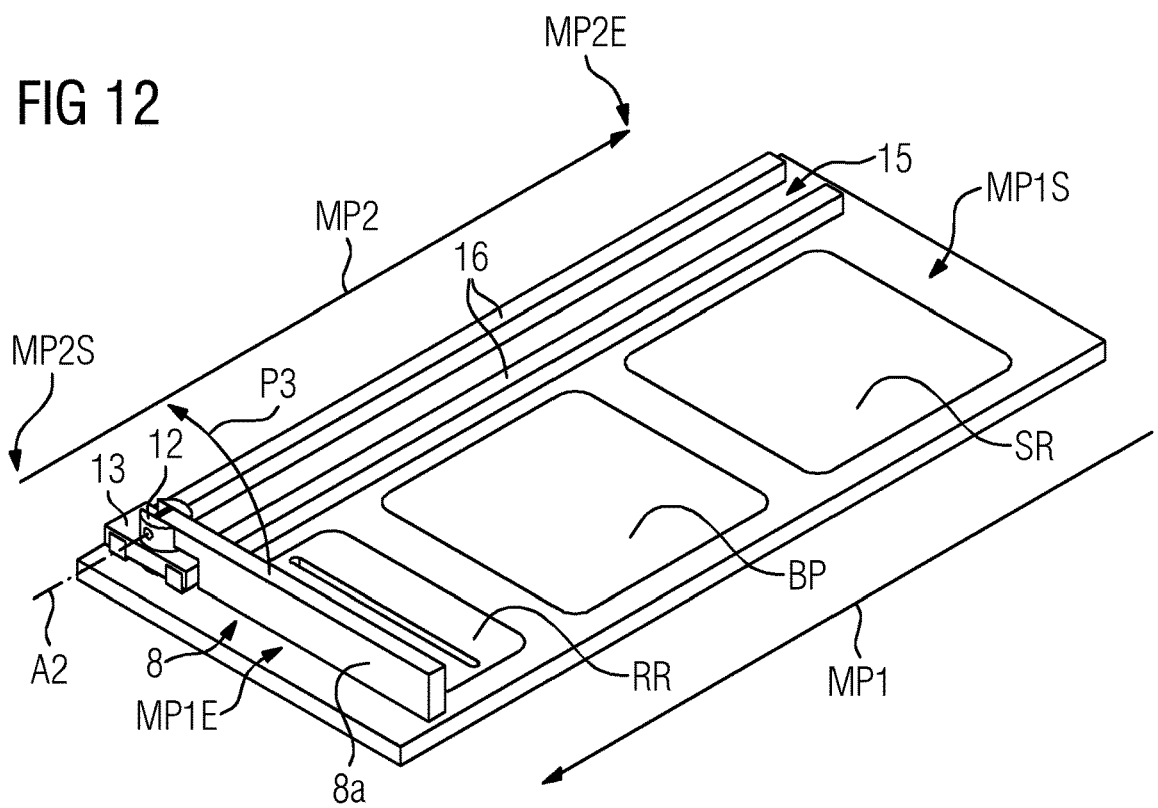
FIG. 12 shows an enlarged view of a build material application device of the apparatus according to a second exemplary embodiment.
Figure 13:
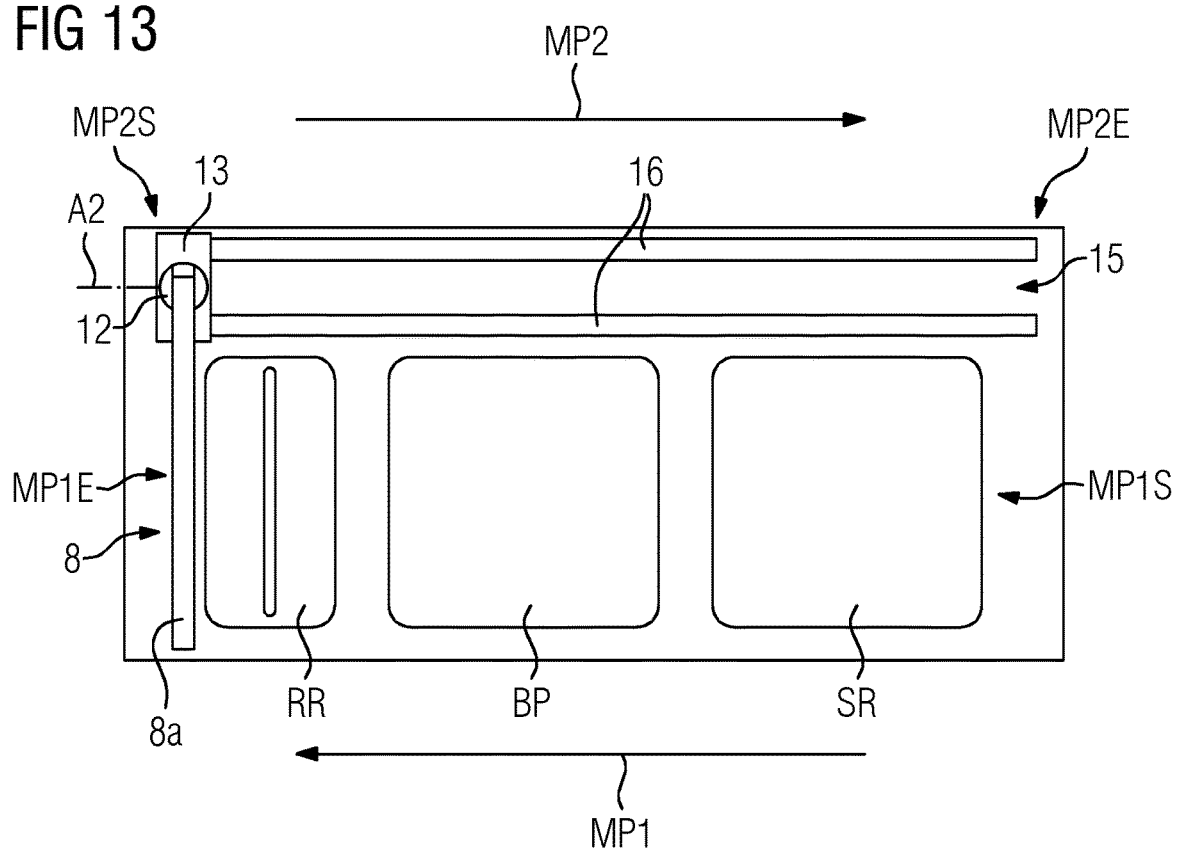
FIG. 13 shows an enlarged view of a build material application device of the apparatus according to a second exemplary embodiment.
Figure 14:
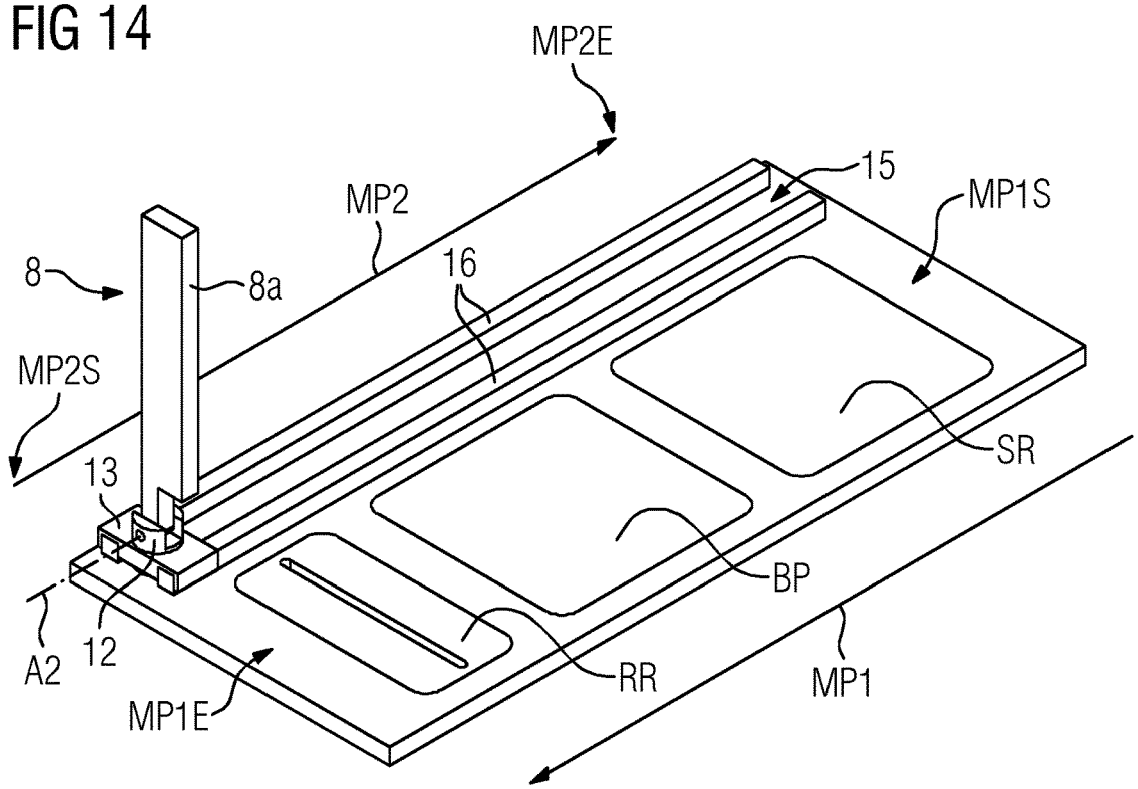
FIG. 14 shows an enlarged view of a build material application device of the apparatus according to a second exemplary embodiment.
Figure 15:
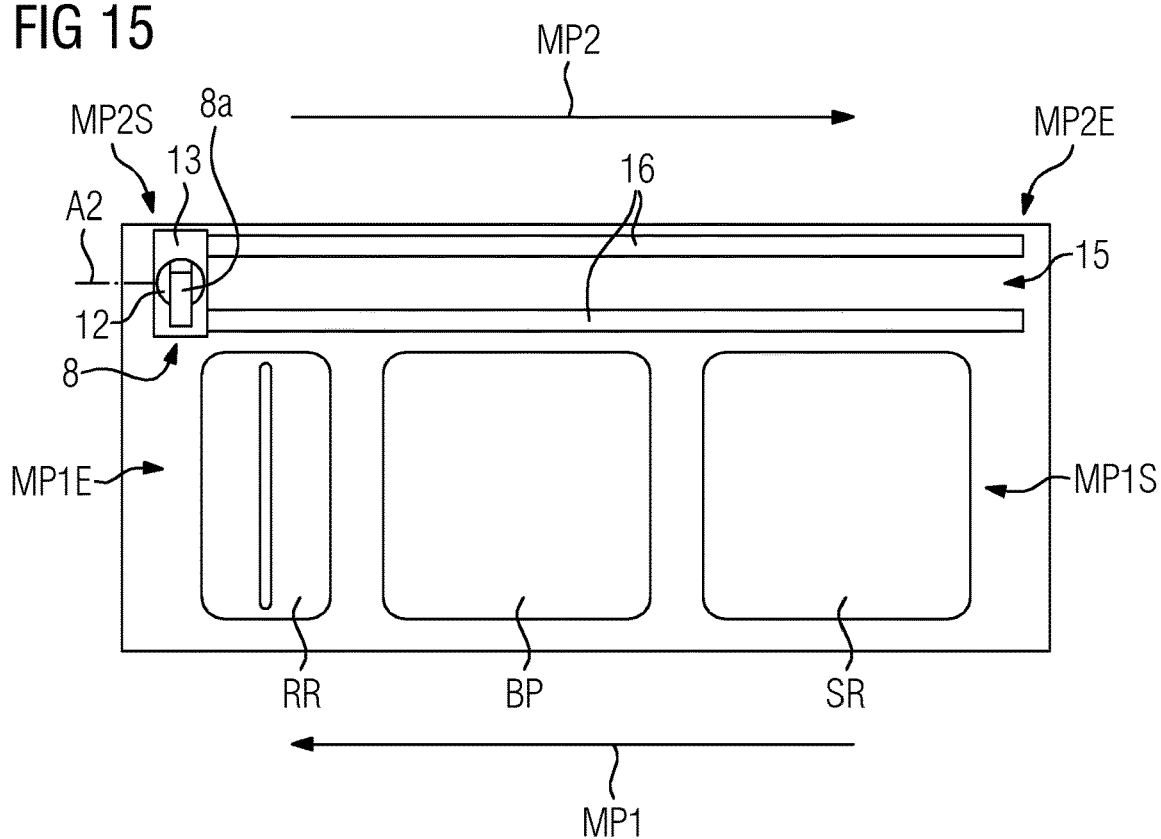
FIG. 15 shows an enlarged view of a build material application device of the apparatus according to a second exemplary embodiment.
Figure 16:
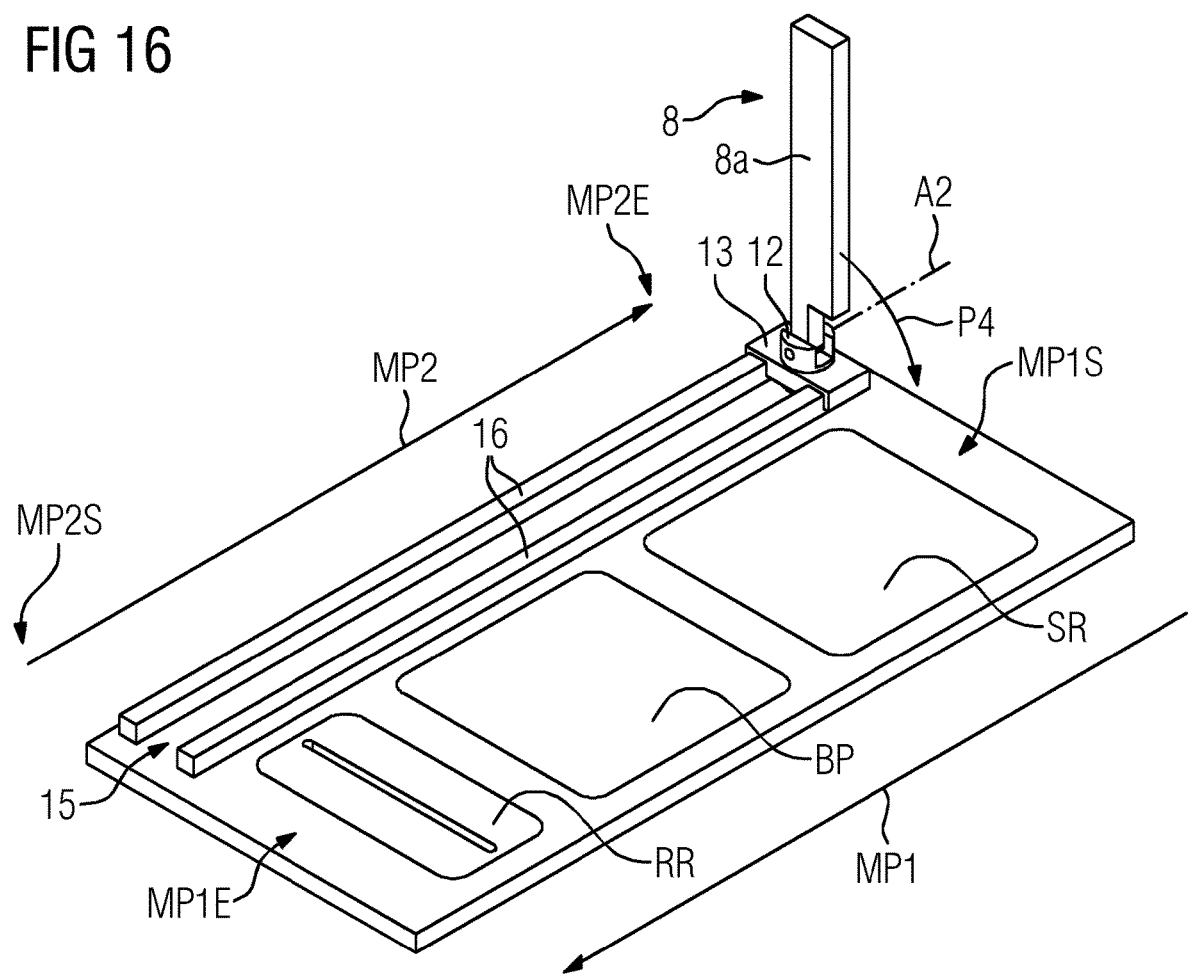
FIG. 16 shows an enlarged view of a build material application device of the apparatus according to a second exemplary embodiment.
Figure 17:
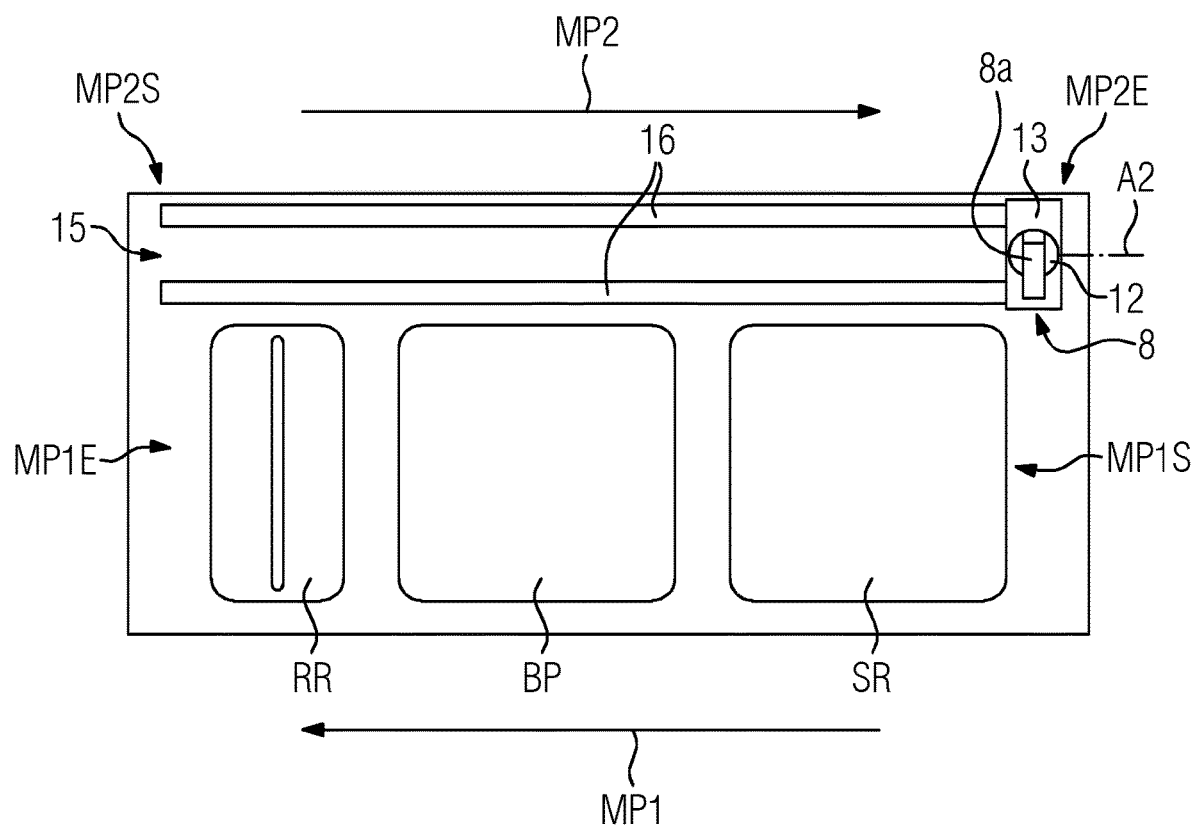
FIG. 17 shows an enlarged view of a build material application device of the apparatus according to a second exemplary embodiment.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

An apparatus is generally provided for additively manufacturing three-dimensional objects successive layerwise selective irradiation and consolidation of layers of build material with an energy beam allowing for a more efficient and productive additive manufacturing of three-dimensional objects.

A first aspect of the invention is an apparatus (hereinafter "apparatus") for additively manufacturing three-dimensional objects, e.g. technical components, by means of successive layerwise selective irradiation and consolidation of build material layers. Typically, respective build material layers can be consolidated by means of at least one energy beam. A respective build material layer may be a layer of a build material powder. The build material powder may comprise at least one of a metal powder, a ceramic powder, or a polymer powder, for instance. A respective energy beam may be an electron beam or a laser beam, for instance. The apparatus may thus, be implemented as a selective electron beam melting apparatus or a selective laser melting apparatus, for instance. Yet, the apparatus may also be implemented as a binder jetting apparatus, particularly as a metal binder jetting apparatus.

The apparatus comprises at least one build plane. Typically, the apparatus comprises only one build plane. The build plane can be defined as a plane in which a successive layerwise selective irradiation and consolidation of layers of build material which can be consolidated by means of an energy beam and thus, an additive build-up of three-dimensional objects can take place during operation of the apparatus.

The apparatus comprises a number of functional devices which are operable during its operation. Each functional device may comprise a number of functional elements. A first exemplary functional device is a build material application device adapted to apply an amount, particularly a specific amount, of build material in the at least one build plane of the apparatus. Another exemplary functional device is an irradiation device adapted to successively selectively irradiate and consolidate respective layers of build material applied in the at least one build plane with at least one energy beam, e.g. an electron beam or a laser beam. The irradiation device may comprise at least one irradiation generating element, particularly an energy beam generating element, adapted to emit the at least one energy beam towards the at least one build plane of the apparatus.

As mentioned before, the build material application device is adapted to apply an amount, particularly a specific amount of build material for generating build material layers which are to be selectively consolidated, in the at least one build plane of the apparatus. Thus, the build material application device is typically allocated to the at least one build plane of the apparatus. By applying an amount of build material in the at least one build plane of the apparatus, a build material layer is formed in the at least one build plane, which build material layer is to be selectively consolidated during operation of the apparatus. Thus, the build material application device is adapted to apply an amount of build material in the at least one build plane of the apparatus so as to form respective build material layers which are to be selectively consolidated during operation of the apparatus. This build material application process is repeated several times during the additive manufacture of three-dimensional objects by means of the apparatus.

The build material application device comprises at least one build material application element. The at least one build material application element may have a longitudinal geometric shape. A respective build material application element may be built as or comprise a re-coating element, e.g. a re-coating blade. Hence, the build material application device may be built as a re-coating device, comprising at least one build material application element being built as a re-coating element, particularly a re-coating blade, or comprising a re-coating element, particularly a re-coating blade. Yet, other embodiments of the build material application device and a respective build material application element are conceivable; as such, the build material application element may be built as or comprise a build material containment having at least one, particularly gate-like, opening through which build material may exit the containment so as to apply an amount, particularly a specific amount, of build material in a respective build plane of the apparatus; the containment may comprise at least one closing element allocated to the at least one opening of the containment. The closing element may be moveably supported relative to the at least one opening between an open and a closed position so as to open or close the at least one opening.

The at least one the build material application element is moveably supported in a first motion path in which the at least one build material application element is moveable or moved across the at least one build plane of the apparatus. Hence, when moving the at least one build material application element in the first motion path, the at least one build material application element is moved across the at least one build plane of the apparatus so that it is possible to apply an amount of build material in the at least one build plane of the apparatus and thus, possible to form a build material layer which is to be selectively irradiated and consolidated during operation of the apparatus in the at least one build plane of the apparatus. The first motion path may be deemed or denoted as a build material application path in which build material is applicable or applied in the at least one build plane of the apparatus.

The first motion path can be defined by a first translational axis of motion, particularly by a first linear axis of motion. The first translational axis of motion can be horizontally oriented, i.e. may extend in a horizontal plane. Thus, the first motion path can be or comprise a first translational axis of motion which is horizontally oriented, i.e. oriented in a horizontal plane.

The at least one build material application element may also be moveably supported in a second motion path in which the build material application element is not moveable or moved across the at least one build plane of the apparatus. Hence, when moving the at least one build material application element in the second motion path, the at least one build material application element is not moved across the at least one build plane of the apparatus so that it is not possible to apply an amount of build material in the at least one build plane of the apparatus and thus, not possible to form a build material layer which is to be selectively irradiated and consolidated during operation of the apparatus in the at least one build plane of the apparatus. The second motion path may be deemed or denoted as a return path in which no build material is applicable or applied in the at least one build plane of the apparatus.

The direction of motion of the at least one build material application element in the first motion path is typically different, e.g. inverse or opposite, to the direction of motion of the at least one build material application element in the second motion path and vice versa. Yet, even though the direction of motion of the at least one build material application element in the first and second motion paths may differ, the first and second motion paths may be parallel oriented. In other words, the first and second motion paths may at least partly extend in parallel.

In either case, the at least one build material application element is transferrable in a first orientation in which the at least one build material application element is operable to apply an amount, particularly a specific amount, of build material in the at least one build plane of the apparatus, and in a second orientation in which the at least one build material application element is not operable to apply an amount, particularly a specific amount, of build material in the at least one build plane of the apparatus. Hence, in the first orientation, the at least one build material application element is oriented relative to the at least one build plane of the apparatus such that the application of build material is possible when being moved along the first motion path, whereas in the second orientation, the at least one build material application element is oriented relative to the at least one build plane of the apparatus such that the application of build material is not possible when being moved along the first motion path.

The first orientation may thus, correspond to an operating state of the of the at least one build material application element, the second orientation may thus, correspond to a non-operating state of the at least one build material application element. As such, the at least one build material application element may be moveably supported in an operating state in which the at least one build material application element is operable to apply an amount of build material in the at least one build plane and in a non-operating state in which the at least one build material application element is not operable to apply an amount of build material in the at least one build plane.

The at least one build material application element is thus, transferable in two different orientations and states, respectively namely the operating state and the non-operating state, which are typically linked with specific orientations and/or positions of the build material application element relative to the at least one build plane of the apparatus. When being transferred in the first orientation (operating state), the at least one build material application element is oriented and/or positioned relative to the build plane in such a manner that applying an amount of build material in the at least one build plane is possible. Hence, when being transferred in the operating position, the at least one build material application element may be moved for applying build material in the at least one build plane of the apparatus. When being transferred in the second orientation (non-operating state), the at least one build material application element is oriented and/or positioned relative to the build plane in such a manner that applying an amount of build material in the at least one build plane is not possible. Hence, when being transferred in the second orientation, the at least one build material application element may be moved for other purposes, e.g. for returning from an end position of the first motion path to a start position of the first motion path.

Motions of the at least one build material application element in between the first orientation and the second orientation are generally independent from motions of the at least one build material application element in the first motion path. Yet, motions of the at least one build material application element in specific positions of the first motion path, e.g. in a start position of the first motion path and/or in an end position of the first motion path, may trigger motions of the at least one build material application element from the first orientation in the second orientation or vice versa.

As mentioned above, the first orientation and the second orientation of the at least one build material application element are typically linked with specific orientations and/or positions of the at least one build material application element relative to the at least one build plane of the apparatus. As such, the at least one build material application element may be moved in a first (spatial) orientation and/or position relative to the at least one build plane of the apparatus allowing for moving the at least one build material application element in the first motion path across the at least one build plane of the apparatus in the operating state and may be moved in a second (spatial) orientation and/or position relative to the at least one build plane of the apparatus not allowing for moving the at least one build material application element in the first motion path across the at least one build plane of the apparatus in the non-operating state.

In the first orientation and/or position, which corresponds to the operating state, the build material application element is typically moved in a first plane parallel to the build plane. Thereby, the build material application element is moveable across the at least one build plane in the first orientation and/or position.

In the second orientation and/or position, which corresponds to the non-operating state, the build material application element may be oriented and/or positioned in different configurations.

According to a first exemplary configuration, the build material application element may be moved in a second plane not parallel to the build plane, whereby the build material application element is not moveable across the at least one build plane. Hence, the build material application element may not be able to apply an amount of build material in the build plane in the first exemplary configuration since it is moved in a plane, i.e. the second plane, in which it cannot be moved across the build plane.

This may be implemented in that the build material application element is pivotably supported around a pivot axis, e.g. a horizontal pivot axis, whereby the build material application element is transferrable from the first orientation and/or position to the second orientation and/or position, and vice versa, by a pivot motion around the pivot axis. In other words, the build material application element may be pivotable or pivoted between a pivot position corresponding to the first orientation and/or position and thus, the operating position and a second pivot position corresponding to the second orientation and/or position and thus, the non-operating position. A transfer of the build material application element from the first orientation and/or position to the second orientation and/or position is thus, possible by pivot motion around a respective pivot axis.

According to a second exemplary configuration, the build material application element may be moved in a first plane parallel to the build plane, whereby the build material application element is positioned and/or oriented relative to the build plane so as not to be moveable across the at least one build plane. Hence, the build material application element may not be able to apply an amount of build material in the build plane in the second exemplary configuration since it is moved in an orientation and/or position within the first plane in which it cannot be moved across the build plane.

This may be implemented in that the build material application element is pivotably supported around a second pivot axis, e.g. a vertical pivot axis, whereby the build material application element is transferrable from the first orientation and/or position to the second orientation and/or position, and vice versa, by a pivot motion around the second pivot axis. In other words, the build material application element may be pivotable or pivoted between a pivot position corresponding to the first orientation and/or position and thus, the operating position and a second pivot position corresponding to the second orientation and/or position and thus, the non-operating position. As will be apparent from below, a transfer of the at least one build material application element from the first orientation and/or position to the second orientation and/or position is thus, possible by pivot motion around a respective second pivot axis.

By providing at least one build material application element being transferrable in a first orientation and in a second orientation, a highly efficient application of build material in the at least one build plane of the apparatus is feasible. Thus, the apparatus, particularly the build material application device, allows for an efficient application of build material in the at least one build plane. An efficient application of build material in the build plane results in an efficient and productive additive manufacturing of three-dimensional objects.

As is apparent from above, in the first orientation, the at least one build material application element is typically oriented relative to the build plane in an orientation allowing for moving the build material application element in the first motion path across the at least one build plane of the apparatus so as to apply build material in the at least one build plane of the apparatus and generate a build material layer in the at least one build plane of the apparatus, and in the second orientation, the at least one build material application element is oriented relative to the build plane in an orientation not allowing for moving the build material application element in the first motion path across the at least one build plane of the apparatus so as not to apply build material in the at least one build plane of the apparatus and not to generate a build material layer in the at least one build plane of the apparatus.

Hence, in the first orientation, the at least one build material application element may be moveable or moved in a first plane parallel to the at least one build plane of the apparatus, whereby it is oriented and/or positioned relative to the at least one build plane of the apparatus so as to be moveable across the at least one build plane of the apparatus.

Hence, in the second orientation, the at least one build material application element may be moveable or moved in a second plane not parallel to the at least one build plane of the apparatus, whereby the at least one build material application element is not moveable across the at least one build plane of the apparatus. Particularly, in the second orientation, the at least one build material application element may be moveable or moved in a plane inclined relative to the at least one build plane of the apparatus. As such, the free distal end of the (longitudinal) build material application element may point out of the at least one build plane of the apparatus such that an acute angle may extend between the at least one build material application element and the at least one build plane of the apparatus. More particularly, in the second orientation, the at least one build material application element may be moveable of moved in a plane perpendicularly inclined relative to the build plane. As such, the free distal end of the (longitudinal) build material application element may point out of the at least one build plane of the apparatus such that an angle of 90° or more may extend between the at least one build material application element and the at least one build plane of the apparatus.

According to an exemplary embodiment, the at least one build material application element is pivotably supported around a pivot axis, whereby the at least one build material application element is transferrable from the first orientation to the second orientation, and vice versa, by a pivot motion around the pivot axis. Hence, the build material application device may comprise at least one pivot device configured to pivot the at least one build material application element around the at least one pivot axis, particularly in between the first and second orientations.

The pivot axis may be a horizontal axis, i.e. a horizontally oriented pivot axis, or a vertical axis, i.e. a vertically oriented pivot axis, for instance. As such, in case of the pivot axis being a horizontal pivot axis, the at least one build material application element may be pivoted in a first orientation in which it is oriented parallel to the at least one build plane of the apparatus and in a second orientation in which it is not oriented parallel to the at least one build plane of the apparatus, but oriented with a specific angle, e.g. an acute angle or an angle of 90° or more, relative to the build plane of the apparatus.

The apparatus may comprise a guiding device configured to guide the at least one build material application element at least in the first motion path. The guiding device may comprise at least one guiding element, particularly a guiding rail or a guiding slide, which is, particularly mechanically, couplable or coupled with the at least one build material application element. A respective guiding element may be disposed at or in a (bottom) wall element of the process chamber of the apparatus. A respective guiding element may extend parallel to the first motion path.

The guiding device may further comprise at least one guiding carriage moveably coupleable or coupled with the at least one guiding element so as to be moved relative to the at least one guiding element. The guiding carriage is typically, also moveably along the first motion path.

The build material application device may further comprise at least one pivot device coupleable or coupled with the at least one guiding carriage, the pivot device being coupleable or coupled with the at least one build material application element so as to pivotably support the at least one build material application element around the pivot axis, whereby the build material application element is transferrable from the first orientation to the second orientation, and vice versa, by a pivot motion around the pivot axis. The pivot device may be built as or comprise a suitable pivot mechanism allowing for a respective pivot motion of the at least one build material application element around the pivot axis.

The apparatus may further comprise at least one drive device adapted to generate a drive force for moving the at least one build material application element in the first motion path. The drive device may be built as or comprise at least one drive device, e.g. a linear drive device, in particular a linear motor, adapted to generate a respective drive force which acts on the at least one build material application element so as to move the at least one build material application element in the first motion path. The drive device may comprise at least one drive element, particularly a drive belt, being couplable or coupled with the at least one build material application element. A respective drive element may be disposed at or in a (bottom) wall element of the process chamber of the apparatus. A respective drive element may extend parallel to the first motion path.

As is apparent from above, the first motion path the at least one build material application element is movably supported in, i.e. along which the build material application element can be moved, is typically defined by a motion path-related start position and a motion path-related end position. As such, the first motion path may extend between a motion path-related start position of the first motion path and a motion path-related end position of the first motion path.

The start position of the first motion path may be (laterally) offset from a first side of the at least one build plane of the apparatus, whereby the first motion path comprises the at least one build plane of the apparatus. In other words, the start position of the first motion path may be laterally adjacently located to a first (lateral) side of the at least one build plane of the apparatus. The start position of the first motion path may particularly, be in or (laterally) in front of a (first) build material supplying region from which an amount of build material, which is to be applied in the at least one build plane of the apparatus during motion of the at least one build material application element in the first motion path, is supplyable or supplied. A respective build material supplying region may be provided by a dose device, particularly by a dose module, which is adapted to dose an amount, particularly a specific amount, of build material which is to be applied in the at least one build plane during of the apparatus motion of the build material application element in the first motion path.

The end position of the first motion path may be (laterally) offset from a second side of the at least one build plane of the apparatus, whereby the first motion path comprises the at least one build plane of the apparatus. The second side of the at least one build plane of the apparatus may be opposite to the first side of the at least one build plane of the apparatus. In other words, the end position of the first motion path may be laterally adjacently located to a second (lateral) side of the at least one build plane of the apparatus. The end position of the first motion path may particularly, be in or (laterally) behind a build material receiving region in which an amount of build material which was not applied in the at least one build plane of the apparatus during motion of the at least one build material application element in the first motion path, is receivable or received. A respective build material receiving region may be provided by an overflow device, particularly by an overflow module, which is adapted to receive an amount of build material which was not applied in the at least one build plane of the apparatus during motion of the at least one build material application element in the first motion path.

As is apparent from the above, the at least one build material application element may be moved at least partly across a respective build material supplying region allocated to the at least one build plane of the apparatus, the at least one build plane of the apparatus, and at least partly across a respective build material receiving region allocated to the at least one build plane of the apparatus during motion in the first motion path. Particularly, the build material application element may be moved across a respective (first) build material supplying region, the at least one build plane of the apparatus, and a respective (first) build material receiving region during motion in the first motion path. Hence, a respective first motion path may comprise a motion across a respective (first) build material supplying region, the at least one build plane of the apparatus, and a respective (first) build material receiving region. Thus, the start and end position of the first motion path are typically arranged in the plane which comprises the at least one build plane of the apparatus and also a respective (first) build material supplying region and/or (first) build material receiving region. Hence, the first motion path may be expressed by a line extending across the at least one build plane of the apparatus, preferably across a respective (first) build material supplying region, the at least one build plane of the apparatus and a respective (first) build material receiving region.

The apparatus may comprise a hardware- and/or software embodied control device adapted to control motions of the at least one build material application element from the first orientation to the second orientation or vice versa. The control device is particularly adapted to control a motion of the at least one build material application element from the first orientation to the second orientation, i.e. transfer the at least one build material application element from the first orientation to the second orientation, when the at least one build material application element is moved in the end position of the first motion path and adapted to control a motion of the at least one build material application element from the first orientation to the second orientation, i.e. transfer the at least one build material application element from the second orientation to the first orientation, when the at least one build material application element is moved in the start position of the first motion path.

The control device may thus, be adapted to determine motions and/or positions of the at least one build material application element when being moved in the first motion path or may process respective positional data so as to control motions of the at least one build material application element from the first orientation to the second orientation or vice versa. As such, the control device may process determined motions and/or positions of the at least one build material application element in the first motion path, e.g. in a start position of the first motion path and/or in an end position of the first motion path, so as to trigger motions of the at least one build material application element from first orientation to the second orientation or vice versa.

At least one motion and/or position determination device, e.g. a motion and/or position encoder, can be associated with the at least one build material application element so as to qualitatively and/or quantitatively determine a (current) motion and/or position of the at least one build material application element.

A second aspect of the invention relates to a build material application device for an apparatus for additively manufacturing three-dimensional objects by means of successive layerwise selective irradiation and consolidation of layers of build material which can be consolidated by means of an energy beam, particularly an apparatus as described herein, the build material application device being adapted to apply an amount of build material in at least one build plane of a respective apparatus. The at least one build material application element is transferrable supported in a first orientation in which the at least one build material application element is operable to apply an amount of build material in the at least one build plane and in a second orientation in which the at least one build material application element is not operable to apply an amount of build material in the at least one build plane.

All annotations concerning the apparatus also apply to the build material application device.

A third aspect of the invention relates to a method for applying an amount of build material in at least one build plane of an apparatus for additively manufacturing three-dimensional objects by means of successive layerwise selective irradiation and consolidation of layers of build material which can be consolidated by means of an energy beam, particularly an apparatus as described herein, the method comprising the steps of:

i) moving or transferring the at least one build material application element in a first orientation in which the build material application element is operable to apply an amount of build material in the at least one build plane, ii) moving the at least one build material application element in a first motion path in which the at least one build material application element is moved across the at least one build plane of the apparatus between a start position and an end position of the at least first motion path, and iii) moving or transferring the at least one build material application element in a second orientation in which the build material application element is not operable to apply an amount of build material in the at least one build plane when the at least one build material application element is moved in the end position of the first motion path; and iv) moving the at least one build material application element in the start position of the first motion path from which the build material application element is moveable across the at least one build plane of the apparatus between a start position and end position of the first motion path.

When implementing the method, steps (i)-(iv) may be repeated several times. Thereby, step (i) may follow after step (iv), i.e. the method may return to step (i) when step (iv) is accomplished.

The method may be implemented by means of an apparatus or a build material application device, respectively as described herein; hence, all annotations concerning the apparatus and the build material application device also apply to the method.

Exemplary embodiments of the invention are described with reference to the Figures. FIG. 1 shows a principle drawing of an apparatus 1 for additively manufacturing three-dimensional objects 2, e.g. technical components, by means of successive layerwise selective irradiation and accompanying consolidation of layers of a build material 3, e.g. a metal powder, which can be consolidated by means of at least one energy beam 4, e.g. an electron beam or a laser beam, according to an exemplary embodiment. The apparatus 1 can be a selective electron beam melting apparatus or a selective laser melting apparatus, for instance.

The apparatus 1 comprises a number of functional devices which are operable during its operation. Each functional device may comprise a number of functional devices. Operation of the functional devices and the apparatus 1, respectively is controlled by a central control device (not depicted).

A first exemplary functional device is a build device 5, particularly a build module, comprising at least one build plate 6. The build device 5 is provided in a (single) build region BR1 of a process chamber 7 of the apparatus 1. The build region BR1 is associated with a (single) build plane BP of the apparatus 1. Hence, the build plane BP defines a build region BR1. The build device 5 may be detachably coupled to the process chamber 7, i.e. particularly to a bottom wall of the process chamber 7.

The build plate 6 may define the spatial extension of the build plane BP in which build material layers are successively applied and successively selectively irradiated and consolidated during operation of the apparatus 1. The build plate 6 is typically vertically moveably supported.

A further exemplary functional device is a build material application device 8, e.g. a re-coating device, adapted to successively apply layers of build material 3 which are to be successively selectively irradiated and consolidated during operation of the apparatus 1 in the build plane BP.

A further functional device is an irradiation device 9 adapted to successively selectively irradiate and consolidate respective layers of build material 3 applied in the build plane BP with the at least one energy beam 4.

A further functional device is an optional dose device 10, particularly a dose module, which is adapted to dose a specific amount of build material 3 which is to be applied in the build plane BP. The dose device 10 is provided in a powder supplying region SR of the process chamber 7 of the apparatus 1. The dose device 10 may be detachably coupled to the process chamber 7, i.e. particularly to a bottom wall of the process chamber 7.

A further functional device is an optional overflow device 11, particularly an overflow module, which is adapted to receive a specific amount of build material 3 which was not applied in the build plane BP. The overflow device 11 is provided in at least one build material receiving region RR of the process chamber 7. The overflow device 11 may be detachably coupled to the process chamber 7, i.e. particularly to a bottom wall of the process chamber 7.

As mentioned above, the build material application device 6 is adapted to apply a specific amount of build material 3 in the build plane BP so as to form a build material layer which is to be selectively irradiated and consolidated during operation of the apparatus 1. This build material application process is repeated several times during operation of the apparatus 1.

As is apparent from the exemplary embodiments according to FIG. 2-17 showing exemplary embodiments of the build material application device 8, the build material application device 8 comprises a build material application element 8a, i.e. re-coating element, e.g. a re-coating blade. Yet, other embodiments of the build material application device 8 and a respective build material application element 8a are conceivable; as such, the build material application element 8a may be built as a build material containment (not shown) having at least one, particularly gate-like, opening through which build material 3 may exit the containment so as to apply a specific amount of build material 3 in the build plane BP; the at least one opening being controllably closable by at least one closing element.

As is further apparent from FIG. 2-17, whereby, FIGS. 2, 4, 6, 8, 10, 12, 14, 16 each show an isometric view and FIGS. 3, 5, 7, 9, 11, 13, 15, 17 each show a top-view, the first build material application element 6a is moveably supported in a first translational motion path MP1 in which the build material application element 8a is moved across the build material supplying region SR, the build plane BP and the build material receiving region RR of the apparatus 1. Likewise, the build material application element 8a is moveably supported in a second translational motion path MP2 (indicated by arrow) in which the build material application element 8a is not moved across the build material supplying region SR, the build plane BP and the build material receiving region RR of the apparatus 1.

The respective motion paths MP1-MP2 the build material application element 8a is movably supported in, i.e. along which the build material application element 8a can be moved, are defined by a motion path-related start position MP1S, MP2S and a motion path-related end position MP1E, MP2E. As such, the first motion path MP1 extends between start position MP1S and end position MP1E and the second motion path MP2 extends between start position MP2S and end position MP2E.

The start position MP1S of the first motion path MP1 is laterally offset from a first side (right side) of the build plane BP. In other words, the start position MP1S of the first motion path MP1 is laterally adjacently located to a first (lateral) side of the build plane BP. The start position MP1S of the first motion path MP1 is in the build material supplying region SR. The end position MP1E of the first motion path MP1 is laterally offset from the first side (left side) of the build plane BP. In other words, the end position MP1E of the first motion path MP1 is laterally adjacently located to a second (lateral) side of the build plane BP. The end position MP1E of the first motion path MP1 is in the build material receiving region RR. Hence, the first motion path MP1 may be expressed by a line extending across the build plane BP.

In the exemplary embodiment of FIG. 2-9, the start position MP2S of the second motion path MP2 corresponds to the end position MP1E of the first motion path MP1 but with a specific (lateral) offset such that the build material application element 8a cannot move across the build material supplying region SR, the build plane BP and the build material receiving region RR. Likewise, the end position MP2E of the second motion path MP2 corresponds to the start position MP1S of the first motion path MP1 but with a specific (lateral) offset such that the build material application element 8a cannot move across the build material supplying region SR, the build plane BP and the build material receiving region RR. Hence, the second motion path MP2 may be expressed by a line not extending across the build plane BP.

As is apparent from FIG. 2-9, the first motion path MP1 and the second motion path MP2 extend in the same horizontal plane. Yet, the first motion path MP1 and the second motion path MP1 are (laterally) offset from each other while being arranged in the same horizontal plane. In other words, the first motion path MP1 and the second motion path MP2 extend in parallel given that the first motion path MP1 extends across the build plane BP and the second motion path MP2 does not extend across the build plane BP.

FIG. 2-9 show different stages of the motion of the build material application element 8a, i.e. stages in its start position MP1S of the first motion path MP1 (see FIGS. 2, 3), in its end position MP1E of the first motion path MP1 (see FIG. 4, 5), in its start position MP2S of the second motion path MP2 (see FIGS. 6, 7), and in its end position MP2E of the second motion path MP2 (see FIGS. 8, 9), during operation of the apparatus 1 according to a first exemplary embodiment.

Likewise, FIG. 10-17 show different stages of the motion of the build material application element 8a, i.e. stages in its start position MP1S of the first motion path MP1 (see FIGS. 10, 11), in its end position MP1E of the first motion path MP1 (see FIGS. 12, 13), in its start position MP2S of the second motion path MP2 (see FIGS. 14, 15), and in its end position MP2E of the second motion path MP2 (see FIGS. 16, 17), during operation of the apparatus 1 according to a first exemplary embodiment.

As is apparent from FIG. 2-17, the build material application element 8a is transferrable in a first orientation (see FIG. 2-5, FIG. 10-13) in which the build material application element 8a is operable to apply an amount, particularly a specific amount, of build material 3 in the build plane BP, and in a second orientation (see FIG. 6-9, FIG. 14-17) in which the build material application element 8a is not operable to apply an amount, particularly a specific amount, of build material 3 in the build plane BP. Hence, in the first orientation, the build material application element 8a is oriented relative to the build plane BP such that the application of build material 3 is possible when being moved along the first motion path MP1, whereas in the second orientation, the build material application element 8a is oriented relative to the build plane BP such that the application of build material 3 is not possible.

The first orientation may thus, correspond to an operating state of the build material application element 8a, the second orientation may thus, correspond to a non-operating state of the build material application element 8a. As such, the build material application element 8a may be moveably supported in an operating state in which the build material application element 8a is operable to apply an amount of build material 3 in the build plane BP and in a non-operating state in which the build material application element 8a is not operable to apply an amount of build material 3 in the build plane BP.

The build material application element 8a is thus, transferable in two different orientations and states, respectively namely the operating state and the non-operating state, which are typically linked with specific orientations and/or positions of the build material application element 8a relative to the build plane BP. When being transferred in the first orientation (operating state), the build material application element 8a is oriented and/or positioned relative to the build plane BP in such a manner that applying an amount of build material 3 in the build plane BP is possible. Hence, when being transferred in the operating position, the build material application element 8a may be moved for applying build material in the build plane BP. When being transferred in the second orientation (non-operating state), the build material application element 8a is oriented and/or positioned relative to the build plane BP in such a manner that applying an amount of build material 3 in the build plane BP is not possible. Hence, when being transferred in the second orientation, the build material application element 8a may be moved for other purposes, e.g. for returning from an end position MP1E of the first motion path MP1 to a start position MP1S of the first motion path MP1.

Motions of the build material application element 8a in between the first orientation and the second orientation are generally independent from motions of the build material application element 8a in the first motion path MP1. Yet, motions of the build material application element 8a in specific positions of the first motion path MP1, e.g. in a start position MP1s of the first motion path MP1 and/or in an end position MP1E of the first motion path MP1, may trigger motions of the build material application element 8a from the first orientation in the second orientation or vice versa.

As mentioned above, the first orientation and the second orientation of the build material application element 8a are typically linked with specific orientations and/or positions of the build material application element 8a relative to the build plane BP. As such, the build material application element 8a may be moved in a first (spatial) orientation and/or position relative to the build plane BP allowing for moving the build material application element 8a in the first motion path MP1 across the build plane BP in the operating state and may be moved in a second (spatial) orientation and/or position relative to the build plane BP not allowing for moving the build material application element 8a in the first motion path across the build plane BP in the non-operating state.

In the exemplary embodiment of FIG. 2-9, the build material application element 8a is pivotably supported around a vertically oriented pivot axis A1 defined by a pivot device 12. The pivot device 12 is provided with a guiding carriage 13 coupled with guiding elements 16, e.g. guiding rails, of a guiding device 15. The guiding carriage 13 is moveably coupled with the guiding elements 16 so as to be moved relative to the guiding elements 16. The guiding elements 16 are disposed at or in a (bottom) wall element of the process chamber 7. The guiding elements 16 extend parallel to the first motion path MP1.

In this embodiment, the build material application element 8a is pivotably supported around a vertical pivot axis A1, whereby the build material application element 8a is transferrable from the first orientation to the second orientation, and vice versa, by a pivot motion around the vertical pivot axis A1. Respective pivot motions are indicated by arrows P1 in FIG. 4 and P2 in FIG. 8.

In the exemplary embodiment of FIG. 10-17, the build material application element 8a is pivotably supported around a horizontally oriented pivot axis A2 defined by a pivot device 12. The pivot device 12 is provided with a guiding carriage 13 coupled with guiding elements 16, e.g. guiding rails, of a guiding device 15. The guiding carriage 13 is moveably coupled with the guiding elements 16 so as to be moved relative to the guiding elements 16. The guiding elements 16 are disposed at or in a (bottom) wall element of the process chamber 7. The guiding elements 16 extend parallel to the first motion path MP1.

In this embodiment, the build material application element 8a is pivotably supported around a horizontal pivot axis A2, whereby the build material application element 8a is transferrable from the first orientation to the second orientation, and vice versa, by a pivot motion around the horizontal pivot axis A2. Respective pivot motions are indicated by arrows P3 in FIG. 12 and P4 in FIG. 16.

In either embodiment, the apparatus 1 may further comprise a drive device (not shown) adapted to generate a drive force for moving the build material application element 8a in the first motion path MP1 and/or in the second motion path MP2. The drive device may be built as or comprise at least one drive device, e.g. a linear drive device, in particular a linear motor, adapted to generate a respective drive force which acts on the build material application element 8a so as to move the build material application element 8a in the first motion path MP1 and/or in the second motion path MP2. The drive device may comprise a drive element, particularly a drive belt, being couplable or coupled with the build material application element 8a. A respective drive element may be disposed at or in a (bottom) wall element of the process chamber 7. A respective drive element may extend parallel to the first motion path MP1.

Returning to FIG. 1, the apparatus 1 may comprise a hardware- and/or software embodied control device 17, e.g. a computer or a computer programme, adapted to control motions of the build material application element 8a from the first orientation to the second orientation or vice versa. The control device 17 is particularly adapted to control a motion of the build material application element 8a from the first orientation to the second orientation, i.e. transfer the build material application element 8a from the first orientation to the second orientation, when the build material application element 8a is moved in the end position MP1E of the first motion path MP1 and adapted to control a motion of the build material application element 8a from the first orientation to the second orientation, i.e. transfer the build material application element 8a from the second orientation to the first orientation, when the build material application element 8a is moved in the start position MP1S of the first motion path MP1.

The control device 17 may thus, be adapted to determine motions and/or positions of the build material application element 8a when being moved in the first motion path MP1 or may process respective positional data so as to control motions of the build material application element 8a from the first orientation to the second orientation or vice versa. As such, the control device 17 may process determined motions and/or positions of the build material application element 8a in the first motion path, e.g. in a start position MP1S of the first motion path MP1 and/or in an end position MP1E of the first motion path MP1, so as to trigger motions of the build material application element 8a from the first orientation to the second orientation or vice versa. The same applies to motions in the second motion path MP2.

At least one motion and/or position determination device (not shown), e.g. a motion and/or position encoder, can be associated with the build material application element 8a so as to qualitatively and/or quantitatively determine a (current) motion and/or position of the build material application element 8a.

The apparatus 1 allows for implementing a method for applying an amount of build material 3 in a build plane BP of an apparatus 1 for additively manufacturing three-dimensional objects 2 by means of successive layerwise selective irradiation and consolidation of layers of build material 3 which can be consolidated by means of an energy beam 4. The method comprises the steps of:

i) moving or transferring the at least one build material application element 8a in a first orientation in which the at least one build material application element 8a is operable to apply an amount of build material 3 in the at least one build plane BP, ii) moving the at least one build material application element 8a in a first motion path in which the at least one build material application element 8a is moved across the at least one build plane BP between a start position MP1S and an end position MP1E of the at least first motion path MP1, and iii) moving or transferring the at least one build material application element 8a in a second orientation in which the at least one build material application element 8a is not operable to apply an amount of build material 3 in the at least one build plane BP when the at least one build material application element 8a is moved in the end position MP1E of the first motion path MP1; and iv) moving the at least one build material application element 8a in the start position MP1S of the first motion path MP1 from which the at least one build material application element 8a is moveable across the build plane BP of the apparatus 1 between a start position MP1S and end position MP1E of the first motion path MP1.

When implementing the method, steps (i)-(iv) may be repeated several times. Thereby, step (i) may follow after step (iv), i.e. the method may return to step (i) when step (iv) is accomplished.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for additively manufacturing three-dimensional objects formed by consolidation of layers of build material, the apparatus comprising:
   at least one build plane arranged in a process chamber;
   at least one build material application device configured to apply an amount of build material in the at least one build plane, the at least one build material application device comprising at least one build material application element being moveably supported in a first motion path in which the at least one build material application element is moveable or moved across the at least one build plane;
   at least one pivot device defining a pivot axis; and
   a guiding device for guiding the at least one build material application device along the first motion path, the guiding device comprising guiding elements disposed at or in a bottom wall element of the process chamber,
   wherein the at least one build material application element is transferrable around the pivot axis from a first orientation in which the at least one build material application element is operable to apply an amount of build material in the at least one build plane to a second orientation in which the at least one build material application element is not operable to apply an amount of build material in the at least one build plane, the pivot axis being defined between the guiding elements.

2. The apparatus according to claim 1, wherein in the first orientation the at least one build material application element is oriented relative to the at least one build plane in an orientation allowing for moving the at least one build material application element in the first motion path across the at least one build plane, and
   in the second orientation the at least one build material application element is oriented relative to the at least one build plane in an orientation not allowing for moving the at least one build material application element in the first motion path across the at least one build plane.

3. The apparatus according to claim 2, wherein in the first orientation, the at least one build material application element is moveable or moved in a first plane parallel to the at least one build plane, whereby the at least one build material application element is oriented and/or positioned relative to the at least one build plane so as to be moveable across the at least one build plane.

4. The apparatus according to claim 2, wherein in the second orientation, the at least one build material application element is moveable or moved in a second plane not parallel to the at least one build plane, whereby the at least one build material application element is not moveable across the at least one build plane.

5. The apparatus according to claim 4, wherein the second plane is inclined relative to the at least one build plane.

6. The apparatus according to claim 4, wherein the second plane is perpendicular relative to the at least one build plane.

7. The apparatus according to claim 2, wherein the at least one build material application element is pivotably supported around the pivot axis, whereby the at least one build material application element is transferrable from the first orientation to the second orientation, and vice versa, by a pivot motion around the pivot axis.

8. The apparatus according to claim 7, wherein the pivot axis is a horizontal axis.

9. The apparatus according to claim 7, wherein the pivot axis is a vertical axis.

10. The apparatus according to claim 1, wherein in the second orientation, the at least one build material application element is moved in a second plane not parallel to the at least one build plane, whereby the at least one build material application element is oriented and/or positioned relative to the at least one build plane so as not to be moveable or moved across the at least one build plane.

11. The apparatus according to claim 1, wherein the guiding device is configured to guide the at least one build material application element in the first motion path, the guiding elements configured to guide the at least one build material application element in the first motion path.

12. The apparatus according to claim 11, further comprising at least one guiding carriage moveably coupleable or coupled with the guiding elements so as to be moved relative to the guiding elements.

13. The apparatus according to claim 12, wherein the at least one pivot device is coupleable or coupled with the at least one guiding carriage, the at least one pivot device also being coupleable or coupled with the at least one build material application element so as to pivotably support the at least one build material application element around the pivot axis, whereby the at least one build material application element is transferrable from the first orientation to the second orientation, and vice versa, by a pivot motion around the pivot axis.

14. The apparatus according to claim 1, further comprising a drive device for generating a drive force for moving the at least one build material application element in the first motion path.

15. The apparatus according to claim 1, wherein the first motion path extends between a start position and an end position, wherein
   the start position of the first motion path is laterally offset from a first side of the at least one build plane, and
   the end position of the first motion path is laterally offset from a second side of the at least one build plane.

16. A method for applying an amount of build material in at least one build plane of the apparatus according to claim 1, the method comprising the steps of:
   i) moving or transferring the at least one build material application element to the first orientation;
   ii) moving the at least one build material application element in the first motion path in which the at least one build material application element is moved across the at least one build plane between a start position and an end position of the first motion path;
   iii) moving or transferring the at least one build material application element to the second orientation when the at least one build material application element is arranged at the end position of the first motion path; and iv) moving the at least one build material application element to the start position of the first motion path.

\* \* \* \* \*